Oct. 25, 1966  F. H. POETTMANN  3,280,848
PIPELINE CONSTRUCTION
Original Filed Jan. 15, 1962

INVENTOR
FRED H. POETTMANN
BY
ATTORNEY

United States Patent Office 3,280,848
Patented Oct. 25, 1966

3,280,848
PIPELINE CONSTRUCTION
Fred H. Poettmann, Littleton, Colo., assignor to Marathon Oil Company, a corporation of Ohio
Original application Jan. 15, 1962, Ser. No. 166,379, now Patent No. 3,220,874, dated Nov. 30, 1965. Divided and this application Aug. 3, 1965, Ser. No. 493,290
3 Claims. (Cl. 138—145)

The present application is a division of application Serial No. 166,379, filed January 15, 1962, now Patent No. 3,220,874.

This invention relates to pipe lines and control of pipeline fluid flow and more particularly relates to methods for increasing the maximum flow capacity of pipe lines.

It is economically desirable to utilize pipe lines to their maximum flow capacity. However, it is known that in continuous operation or after extended periods of usage, pipe lines have their maximum flow capacity reduced due to corrosion and other conditions that roughen interior pipeline flow contacting surfaces; including deposition of foreign materials and substances carried in the fluids (and particularly liquids) being conveyed through a given line. Even under optimum conditions, the interior surface of a pipe line is relatively rough and offers substantial impedance to flow.

Accordingly, it is an object of this invention to provide a simple, economical and efficient method of increasing the maximum flow capacity of pipe lines.

It is another object of the invention to provide a simple, economical and efficient method of increasing the capacity of operating pipe lines after reduced efficiency and flow capacity is detected.

It is still another object of this invention to provide a simple, economical and efficient method of increasing the initial flow capacity of new pipe lines and adapting such lines for optimum performance over extended periods of usage.

Yet another object of my invention is to provide a simple, durable and efficient pipeline structure providing a high flow capacity in lines of standard diameter.

A further object of my invention is to provide a simple, economical and efficient method of distributing a gel-forming liquid as a thin film over a roughened interior surface of a pipe line and thereafter causing said gel to form as a self-sustaining lining for the inner surface of the line which possesses a greater degree of smoothness than the original internal surface of such line.

Other objects reside in novel details of construction and novel combinations and arrangements of parts, all of which will be detailed in the course of the following description.

In one application, the practice of my invention is particularly effective in treating established pipe lines which are conducting fluids at a capacity substantially less than optimum and which may be conditioned for operation at substantially optimum capacity. It is well known and can be demonstrated by the Moody friction factor chart that the pressure drop of fluids flowing in turbulent flow is a function only of the relative roughness, $\epsilon/D$, of a pipe confining such flow.

Thus, the smoother the inner surface of the pipe, the less the pressure drop for a given flow rate will be. For example, in a given pipe section of six inch diameter, if the pressure drop is held constant over a fixed length of such pipe and the roughness is reduced from 0.0006 inch to 0.0001 inch, the flow rate will be increased by approximately 25%; or if the flow rate is held constant and the roughness reduced from 0.0006 inch to 0.0001 inch, the pressure drop will be reduced by 40%.

According to this invention, such a decrease in relative roughness can be accomplished in lines utilizing either single phase dry gas or single phase liquid flow by lining the interior surfaces of the pipe with a specially prepared gel to provide a very thin and extremely smooth fluid-contacting surface. The gel is stable and in the case of liquid flow may be made up from the same material as normally conveyed through the given pipe line. The gel lining may be applied by several methods. In one method, water, with a gelling agent added, such as "Cyanogum 41," and including the retarder potassium ferricyanide, the catalyst system B-dimethylaminopropionitrile ammonium persulfate and a surfactant such as Triton "X–100" is provided to increase the wettability of the pipe, by passing such mixture through a pipe line while it is in a fluid state and formed as a slug so as to completely wet the entire interior surface of the pipe line. After a proper time period has elapsed which is based on the gelling time for the fluid material deposited on the pipe walls, the fluid sets up, thereby providing a very thin and extremely smooth surface lining for contacting the fluid flow through the pipe line.

"Cyanogum 41" is a gelling agent manufactured by the American Cyanamid Company, and in essence, is a mixture of the two organic monomers, acrylamide and N,N'-methylenebisacrylamide, in proportions which produce very stiff gels from dilute aqueous solutions when properly catalyzed. The process by which the gels are formed from the foregoing is a polymerization-crosslinking reaction. "Triton X–100" is a non-ionic surfactant manufactured by Rohn & Haas Company and is octylphenoxy polyethoxy ethanol.

Figure 1:
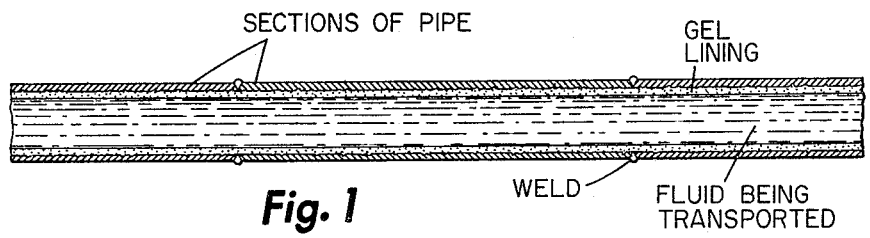
FIGURE 1 is a schematic illustration of an embodiment of the invention.
Figure 2:
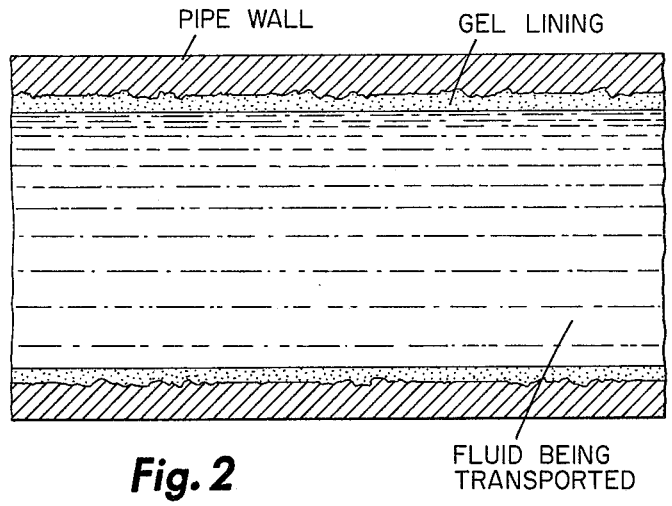
FIGURE 2 is a detail of the pipe line of FIGURE 1 showing the relatively rough pipe wall covered by the relatively smooth gel lining.

In many instances it will be desirable to form a gel lining on the interior of a pipe line conducting a hydrocarbon composition. In such cases the hydrocarbon, which may be gasoline or fuel oil, for example, will have aluminum stearate or aluminum octoate added; and a slug thereof is passed through the pipe line to be lined in a manner similar to that above described. After the interior walls of the pipe line have been properly wetted with the aluminum stearate or aluminum octoate and hydrocarbon system, they are catalyzed by raising the temperature to approximately 140° F. whereupon the desired gelling takes place and a smooth interior lining forms on the wall surface.

In the case of older pipe line systems which are rather badly corroded, either of the foregoing procedures may be followed to provide a very smooth interior lining, thereby greatly reducing the roughness of the liquid-contacting surface and providing substantially optimum flow capacity for the pipe line so treated.

The gels which utilize the "Cyanogum 41" material in an aqueous carrier are formed by the following two step process:

*Step 1.*—An aqueous solution of "Cyanogum 41" containing a retarder for controlling the gel time and the first component of the catalyst system is prepared. In this example, the first catalyst component is B-dimethylaminopropionitrile and the retarder is potassium ferricyanide.

*Step 2.*—The second component of the catalyst system ammonium persulfate is added to the solution of "Cyanogum 41" and retarder prepared according to the procedure set forth in Step 1. After a predetermined period of time a stiff gel will form. However, the mixture remains quite fluid until this gel time is reached.

The following table sets forth alternative catalyst systems utilizing the "Cyanogum 41" gelling agent:

TABLE I

| Liquid to be Gelled | Gelling Agent | Retarder | 1st Catalyst Component | 2nd Catalyst Component |
| --- | --- | --- | --- | --- |
| Water | Cyanogum 41 | Potassium Ferricyanide | B-dimethylaminopropionitrile | Ammonium persulfate (gel time=2→200 min.) |
| Do | do | do | Disodium phosphate Septahydrate. | Ammonium persulfate (gel time=10→600 min.) |
| Water or Glycerine plus water or Ethylene Glycol plus Water. | do | | Di-t-butylperoxide (plus surfactant to keep this material well dispersed. | Heat to 90° C. (or 5 min. gel time). |
| Water | do | | Ferrous ammonium sulfate hexahydrate. | Hydrogen peroxide (or 12 sec. gel time). |
| Do | do | | Sodium Thiosulfate | Hydrogen peroxide (gel time, 14–15 min.) |
| Glycerine or Ethylene Glycol. | do | | do | Ammonium persulfate (gel time, 6 min.) |

As noted above, it is quite frequently desirable to add a surfactant to the aqueous phase to enhance wetting of the pipe wall. One such material is the "Triton X–100" nonionic surfactant discussed above. However, anionic surfactants are equally effective. An example is "Aerosol OT" manufactured by the American Cyanamid Company and which is sodium dioctyl sulfosuccinate. Either of these materials is compatible with the "Cyanogum 41" gelling systems above noted and are excellent water wetting agents.

In the foregoing discussion, and in particular in the table set forth, approximate gel times are set forth. The relative length of time for any given system, of course, is further dependent upon the relative concentration of the various materials used. The "Cyanogum 41" gelling agent produces very stiff gels from extremely dilute aqueous solutions when properly catalyzed. And, of course, stiffer gels are formed faster as the relative concentration of the "Cyanogum 41" is increased. Thus, there are no particularly critical quantity ratios for the materials used in the coating action according to the invention. The aluminum soaps above noted which are used in the hydrocarbon carrier likewise form a relatively stiff gel in dilute solutions.

Table I set forth above discloses the wide range of ingredients which may be employed in the instant method of increasing the capacity of pipe lines. For some treatments wherein it is desirable to have a slow gel time, the second system will be particularly advantageous. In this system, disodium phosphate septahydrate is the first catalyst, ammonium persulfate, the second, while the same retarder potassium ferricyanide is used. Utilizing this system, a gel time from 10–600 minutes may be provided. If a rapid gelling action is desired, the system utilizing as components ferrous ammonium sulfate hexahydrate and hydrogen peroxide, which gels in only 12 seconds, is particularly useful. The slower gel time systems are preferable when the procedure of surface encasing of a body of flowing fluid is to be utilized.

While it has been suggested in the foregoing discussion that a surfactant be added to the aqueous phase to enhance the wetting of the pipe wall, it should be understood that such is not always necessary. This is particularly true when treating new pipes which do not have the very roughened interior surface condition of many older installations.

In the foregoing procedures, I have described practices in which the interior walls of a pipe line to be treated may be coated with or lined by the liquid system, before it gels, by passing a slug of a selected composition through the pipe. Another system which also is applicable is directed to the utilization of concentric flow techniques. In such techniques, porous or apertured annular members are mounted in the pipe line in encompassing relation to a section of pipe and a reservoir of the catalyst system is maintained under pressure about the porous member. Fluid flowing through the pipe line in which the annular member is inserted is encased or filmed circumferentially by the catalyst system and is removed and deposited by wiping on the interior surfaces of the pipe line through which the fluid flows.

One of the innovations of the pipe lining practices of my invention is that the gelling material is introduced into the line as a liquid in a carrier solution and has sufficient wetting properties so that the entire interior surface of the line is wetted by its flow through the line. Such interior surface while seemingly smooth by usual standards actually is a friction surface formed by a succession of peaks or hills and valleys or pits and as such offers substantial impedance to flow. When such a surface corrodes, increasing irregularity results. Consequently, the wiping of such surfaces by the wetting liquid serves to fill and level the irregular surfaces and as gelling proceeds the material so introduced or deposited attains a stable, self-sustaining condition and for practical purposes becomes a continuous adhering lining which is extremely smooth and so thin as to reduce the effective diameter to only a minute degree.

Any reduction in effective inside diameter is more than compensated by the resulting increase in smoothness or evenness of the liquid-contacting surface of the lining. The gels employed for this purpose are stable and will function efficiently during protracted periods of operation. Therefore, they quickly restore the lost efficiency of established pipe lines and may be applied before initiating operation of new pipe lines to render such lines capable of operating at substantially optimum efficiency. As the cost of application is more than offset by the increased transport capability they provide, such linings may be renewed whenever any substantial capacity loss is detected. However, they are durable and function effectively over protracted periods of operation.

As a variety of ingredients have been shown as satisfactory in the practice of my invention, selection of ingredients may be made on a cost or efficiency basis, and also from a quick setting or slow setting preference. Pipe lines treated in accordance with this invention will have their maximum flow capacity increased by lessening their friction effect. In so doing, it is not necessary to separate joined pipe sections as the slugs may be entered through available points of introduction in the line.

I claim:

1. A pipe line having increased flow capacity for transport of fluid, comprising a plurality of sections of pipe joined as a continuous conduit, and a substantially continuous lining on the internal surface of said line comprising a self-sustaining substantially permanent gel formed in adhering relation to interior surfaces of the succession of pipe sections, said gel lining having an internal surface considerably smoother than the internal surface of said sections.

2. A pipe line having increased flow capacity for transport of fluid, comprising a plurality of sections of pipe joined as a continuous conduit, and a substantially continuous self-sustaining substantially permanent gel lining on the internal surface of the line forming an interior surface of substantially the same diameter as the initial diameter of the line and characterized by a liquid-contacting surface considerably smoother than the internal surface of said sections.

3. A pipe line having increased flow capacity for transport of fluid, comprising a plurality of sections of pipe joined as a continuous conduit, and a substantially continuous lining on the internal surface of said line comprising a stable, self-sustaining substantially permanent gel formed in adhering relation to interior surfaces of the succession of pipe sections said gel lining having an interior surface considerably smoother than the interior surface of said sections.

References Cited by the Examiner
UNITED STATES PATENTS

| | | | |
|---|---|---|---|
| 1,605,574 | 11/1926 | Stewart | 138—145 |
| 2,331,824 | 10/1943 | Buckingham | 138—145 X |
| 2,602,760 | 7/1952 | Michel et al. | |

LAVERNE D. GEIGER, *Primary Examiner.*

T. MOORHEAD, *Assistant Examiner.*